(12) United States Patent
Silorio et al.

(10) Patent No.: US 11,760,215 B2
(45) Date of Patent: *Sep. 19, 2023

(54) INTEGRATED MANAGEMENT OF ELECTRIC VEHICLE CHARGING AND NON-ELECTRIC VEHICLE FUELING

(71) Applicant: CyberSwitchingPatents, LLC, San Jose, CA (US)

(72) Inventors: Ronald L. Silorio, Pittsburg, CA (US); Thomas M. Bates, Princeton, NJ (US); Damon Hahn, Princeton, NJ (US); Christopher M. Bates, Belle Mead, NJ (US)

(73) Assignee: CYBERSWITCHINGPATENTS, LLC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,084

(22) Filed: Oct. 25, 2021

(65) Prior Publication Data

US 2022/0045530 A1    Feb. 10, 2022

Related U.S. Application Data

(63) Continuation of application No. 16/883,830, filed on May 26, 2020, now Pat. No. 11,155,174, which is a
(Continued)

(51) Int. Cl.
*H02J 7/00* (2006.01)
*B60L 53/14* (2019.01)
(Continued)

(52) U.S. Cl.
CPC ............ *B60L 53/14* (2019.02); *B60L 53/305* (2019.02); *B60L 53/63* (2019.02); *B60L 53/64* (2019.02);
(Continued)

(58) Field of Classification Search
CPC ....................................................... B60L 53/14
(Continued)

(56) References Cited

U.S. PATENT DOCUMENTS

| 5,594,318 A | 1/1997 | Nor et al. |
| 6,225,776 B1 * | 5/2001 | Chai ............ H02J 7/0013 320/109 |

(Continued)

FOREIGN PATENT DOCUMENTS

| EP | 2388884 B1 | 11/2011 |
| JP | 2012147555 A | 8/2012 |

(Continued)

OTHER PUBLICATIONS

Ching-Yen Chung; et al. "Design of Fair Charing Algorithm for Smart Electrical Vehicle Charging Infrastructure" Article 978-1-4799-0698-7/13/$31.00 2013 IEEE pp. 527-532.

*Primary Examiner* — Yalkew Fantu

(57) ABSTRACT

A fueling system can include an electric vehicle (EV) charging station and a non-charging fueling station for fueling vehicles other than EVs. The EV charging station includes a first control unit, a switching unit, and output connections that can be connected to EVs. The non-charging fueling station includes a second control unit and, for example, a liquid fuel pump. An integrated fuel management system is in communication with the EV charging station and the non-charging fueling station. The switching unit can direct a charging current from an input power supply to an output connection in response to commands from the first control unit that are issued according to a charging procedure. The first control unit can send state information for the EV charging station to the integrated fuel management system. The second control unit can send state information for the non-charging fueling station to the integrated fuel management system.

20 Claims, 15 Drawing Sheets

Related U.S. Application Data continuation of application No. 16/015,030, filed on Jun. 21, 2018, now Pat. No. 10,661,659.

(60) Provisional application No. 62/523,159, filed on Jun. 21, 2017.

(51) Int. Cl.
  *B60L 53/64* (2019.01)
  *B60L 53/63* (2019.01)
  *B60L 53/30* (2019.01)
  *B60L 53/66* (2019.01)
  *B60L 53/65* (2019.01)
  *B60L 53/68* (2019.01)

(52) U.S. Cl.
  CPC ............ *B60L 53/65* (2019.02); *B60L 53/665* (2019.02); *B60L 53/68* (2019.02); *H02J 7/0045* (2013.01); *B60L 2240/70* (2013.01)

(58) Field of Classification Search
  USPC ........................................................ 320/104
  See application file for complete search history.

(56) References Cited

U.S. PATENT DOCUMENTS

| | | | |
|---|---|---|---|
| 9,346,365 | B1 | 5/2016 | Penilla et al. |
| 9,349,365 | B2 | 5/2016 | Rajagopal et al. |
| 9,438,058 | B2 | 9/2016 | Degura et al. |
| 10,106,043 | B2 | 10/2018 | Weber et al. |
| 10,661,659 | B2 * | 5/2020 | Silorio ................. B60L 53/305 |
| 11,155,174 | B2 * | 10/2021 | Silorio ................... B60L 53/65 |
| 2004/0169489 | A1 | 9/2004 | Hobbs |
| 2005/0156577 | A1 | 7/2005 | Sully |
| 2011/0021186 | A1 | 1/2011 | Fischer |
| 2011/0031929 | A1 | 2/2011 | Asada et al. |
| 2011/0032110 | A1 | 2/2011 | Taguchi |
| 2011/0130916 | A1 | 6/2011 | Mayer |
| 2011/0144823 | A1 | 6/2011 | Muller et al. |
| 2011/0204847 | A1 | 8/2011 | Turner |
| 2011/0213656 | A1 | 9/2011 | Turner |
| 2011/0239116 | A1 | 9/2011 | Turner et al. |
| 2011/0246252 | A1 | 10/2011 | Uesugi |
| 2011/0260691 | A1 | 10/2011 | Ishibashi et al. |
| 2012/0013298 | A1 | 1/2012 | Prosser et al. |
| 2012/0235646 | A1 | 9/2012 | Lo et al. |
| 2012/0265459 | A1 | 10/2012 | Sfaelos |
| 2012/0278479 | A1 | 11/2012 | Miller et al. |
| 2012/0330494 | A1 | 12/2012 | Hendrix et al. |
| 2013/0002197 | A1 | 1/2013 | Hernandez et al. |
| 2013/0024306 | A1 | 1/2013 | Shah et al. |
| 2013/0035802 | A1 | 2/2013 | Khaitan et al. |
| 2013/0179061 | A1 | 7/2013 | Gadh et al. |
| 2013/0261953 | A1 | 10/2013 | Kiyama et al. |
| 2013/0314037 | A1 | 11/2013 | Caffy |
| 2013/0346902 | A1 | 12/2013 | Epstein et al. |
| 2014/0062240 | A1 | 3/2014 | Batzner et al. |
| 2014/0062401 | A1 | 3/2014 | Gadh et al. |
| 2014/0085110 | A1 | 3/2014 | Scofield et al. |
| 2014/0163877 | A1 | 6/2014 | Kiyama et al. |
| 2014/0179164 | A1 | 6/2014 | Kanamori et al. |
| 2015/0123595 | A1 | 5/2015 | Hussain et al. |
| 2015/0149221 | A1 | 5/2015 | Tremblay |
| 2015/0346288 | A1 | 12/2015 | Hardy et al. |
| 2016/0088064 | A1 | 3/2016 | Chen et al. |
| 2016/0193932 | A1 | 7/2016 | Vaghefinazari |
| 2017/0158067 | A1 | 6/2017 | Reynolds |
| 2017/0158071 | A1 | 6/2017 | Reynolds et al. |
| 2017/0158075 | A1 | 6/2017 | Reynolds et al. |
| 2018/0065496 | A1 | 3/2018 | Reynolds et al. |
| 2018/0370372 | A1 * | 12/2018 | Silorio ................... B60L 53/14 |

FOREIGN PATENT DOCUMENTS

| | | |
|---|---|---|
| WO | 9632768 A1 | 10/1996 |
| WO | 2011089521 A2 | 7/2011 |

\* cited by examiner

INTEGRATED MANAGEMENT OF ELECTRIC VEHICLE CHARGING AND NON-ELECTRIC VEHICLE FUELING

REFERENCE TO RELATED APPLICATIONS

This application is a continuation of U.S. application Ser. No. 16/883,830, titled "Integrated Management of Electric Vehicle Charging and Non-Electric Vehicle Fueling," filed on May 26, 2020, now U.S. Pat. No. 11,155,174, which is a continuation of U.S. application Ser. No. 16/015,030, titled "Integrated Management of Electric Vehicle Charging and Non-Electric Vehicle Fueling," filed on Jun. 21, 2018, now U.S. Pat. No. 10,661,659, which claims priority to U.S. Provisional Application No. 62/523,159, titled "Integrated Management Of Electric Vehicle Charging," filed on Jun. 21, 2017, all of which are hereby incorporated by reference in their entirety.

This application is related to U.S. patent application Ser. No. 15/222,813, titled "Electric Vehicle Charging System," filed on Jul. 28, 2016, now U.S. Pat. No. 10,850,627, hereby incorporated by reference in its entirety.

BACKGROUND

Electric vehicle (EV) adoption has hit record highs. According to car sales reports for the first quarter of 2017, sales of EVs of all types were up 89% in March and 74% in the first quarter, with fully electric cars showing the greatest gains. At that time, EVs made up 1.2% of all U.S. car sales, a new record for the U.S. EV market. EVs are also popular worldwide.

EVs rely on batteries that periodically need to be charged. Electricity is the new fuel for fleets to manage. Electricity has historically been only a bill or departmental allocation for fleet managers. Now, it must be managed like other fuels. To date, however, there has not been a systematic approach to manage electricity as fuel.

The dynamics of managing electricity as fuel are that delivery and pricing are much different than standard fuels. The electrical infrastructure is already part of a facility's power source, so metering and control for just EVs must be separated from the rest of the power. Electrical power has daily and seasonal pricing differences: summer versus winter rates, and demand charges that are usually based on 15-minute assessments of the peak demand can be a significant part of the utility bill.

A systematic approach to managing electricity as fuel would provide a number of advantages. For example, usage and costs could be closely monitored and controlled, so that performance of the charging system and EVs can be measured, and areas where improvements may be made can be identified.

SUMMARY

In embodiments according to the present invention, a multivehicle fueling system includes one or more electric vehicle (EV) charging stations and one or more stations for fueling non-electric or hybrid vehicles (referred to herein as a non-charging fueling station). The EV charging station includes a first control unit, a switching unit, and output connections that can be connected to EVs. The non-charging fueling station includes a second control unit and, for example, a liquid fuel pump. An integrated fuel management system is in communication with the EV charging station and the non-charging fueling station. The switching unit can direct a charging current from an input power supply to an output connection in response to commands from the first control unit that are issued according to a charging procedure. The first control unit can send state information for the EV charging station to the integrated fuel management system. The second control unit can send state information for the non-charging fueling station to the integrated fuel management system.

Thus, embodiments according to the present disclosure provide an integrated fuel management system. The integrated fuel management system combines a flexible platform for managing fuels (e.g., fleet fuels) of all types with technologies for managing electrical power and EV charging management and control. The integrated fuel management system includes, for example, timely access control, uniform departmental billing, and detailed cloud-based reporting. The technologies for managing electrical power and EV charging management and control include, for example, electrical infrastructure optimization, power metering and control, and a myriad of power utilization reporting tools. The combination integrates EV charging from any charging station into a total fuel management system using controllers and power management systems. The result is a solution that manages electrical power dynamics as part of an integrated, full-featured fuel management system. Consequently, electricity for EV charging can be managed as a standard fleet fuel.

These and other objects and advantages of the various embodiments according to the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Figure 1:
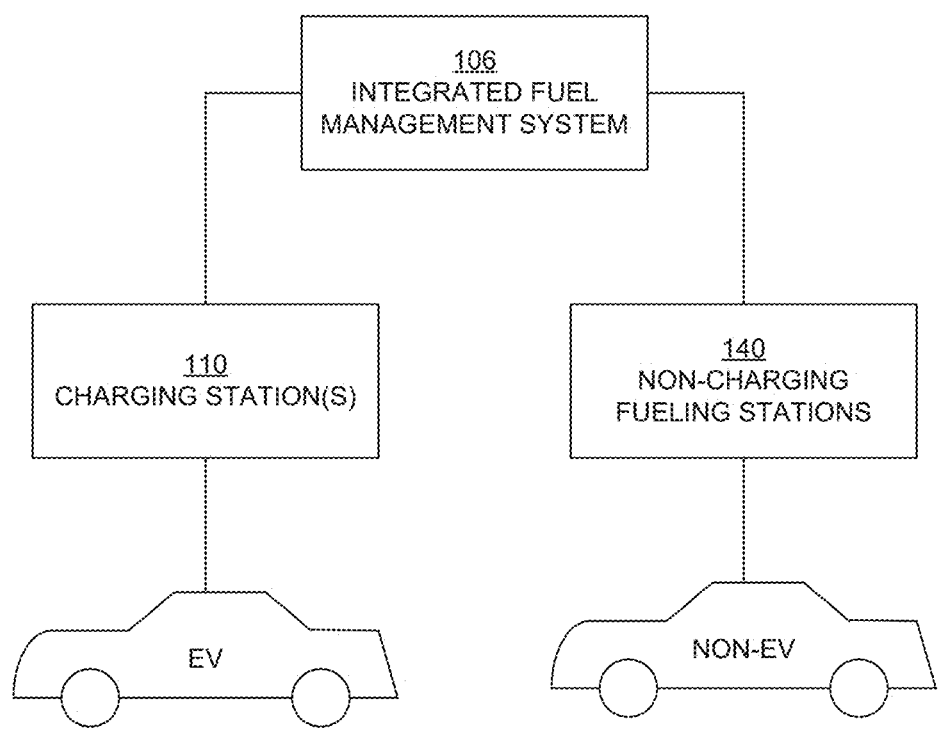
FIG. 1 is a block diagram showing elements of a multivehicle fueling system in an embodiment according to the invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "directing," "sending," "stopping," "determining," "generating," "displaying," "indicating," or the like, refer to actions and processes (e.g., the flowchart 1100 of FIG. 11) of an apparatus or computer system or similar electronic computing device or processor (e.g., the computer system 1200 of FIG. 12). A computer system or similar electronic computing device manipulates and transforms data represented as physical (electronic) quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory (e.g., an SSD or NVMD) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram showing selected elements of a multivehicle fueling system 100 in an embodiment according to the invention. The multivehicle fueling system 100 can include a number of different charging stations, such as the charging station 110, for charging electric vehicles (EVs). An EV can be any type of vehicle such as, but not limited to, a car, truck, motorcycle, golf cart, or motorized (power-assisted) bicycle. Embodiments according to the invention can be utilized with Level 2 or Level 3 charging stations, although the invention is not limited to such types of charging stations and can be utilized in other types that may come into existence in the future.

The multivehicle fueling system 100 can also include stations 140 (e.g., pumps) that provide liquid fuel (such as, but not limited to, gasoline) to hybrid or non-electric vehicles. Generally speaking, considering electricity as a fuel, the stations 140 provide fuel other than electricity, and so may be referred to herein as non-charging stations or non-charging fueling stations.

As will be described below, an integrated fuel management system 106 manages the multivehicle fueling system 100.

Figure 2:
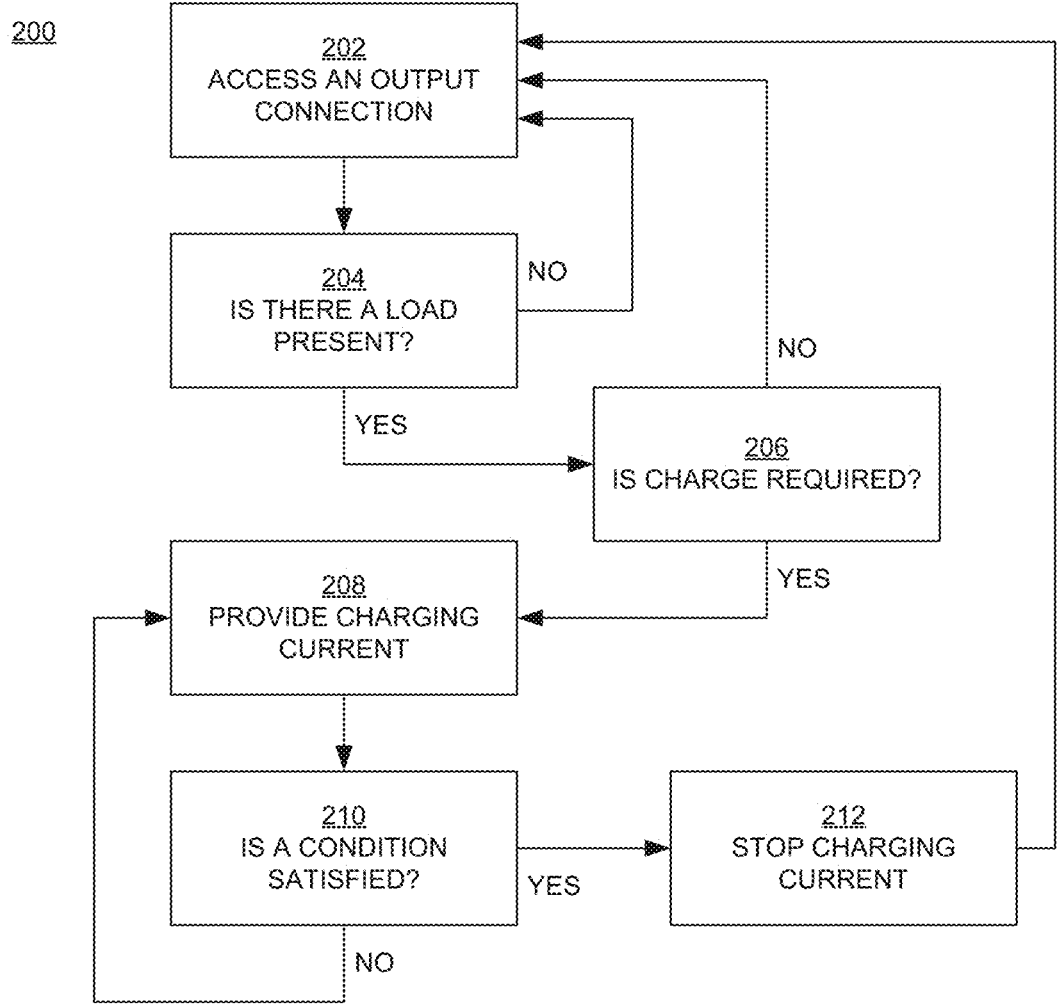
FIG. 2 is a flowchart illustrating a method of charging one or more electric vehicles (EVs) in an embodiment according to the invention.

The flowchart 200 of FIG. 2 illustrates a charging procedure an embodiment according to the invention. In block 202, an output connection is selected or accessed. In block 204, a determination is made whether there is a load (an EV) present on the selected output connection. This determination can be made automatically. If not, then the flowchart 200 returns to block 202 and another output connection is selected or accessed in accordance with a charging sequence or procedure. If there is a load present, then the flowchart 200 proceeds to block 206.

In block 206, a check is made to determine whether the EV requires a charge. If so, then the flowchart 200 proceeds to block 208; otherwise, the flowchart returns to block 202 and another output connection is selected or accessed.

In block 208, a charging current is provided to the selected output connection. In block 210, a determination is made whether a condition is satisfied. The condition may be, for example, an interval of time has expired or the charging current to the selected output connection has decreased to a threshold value.

If the condition is satisfied, then the charging current to the selected output connection is stopped in block 212, and then the flowchart 200 returns to block 202 and another output connection is selected or accessed according to the charging sequence or procedure. In an embodiment, a charging current is provided to each of the output connections connected to an EV in round-robin fashion, one output connection at a time. If an output connection is not connected to an EV or if the EV does not require further charging, then the output connection is automatically skipped.

If the condition is not satisfied, then the flowchart 200 returns to block 208 and the charging current to the selected output connection is continued.

Figure 3:
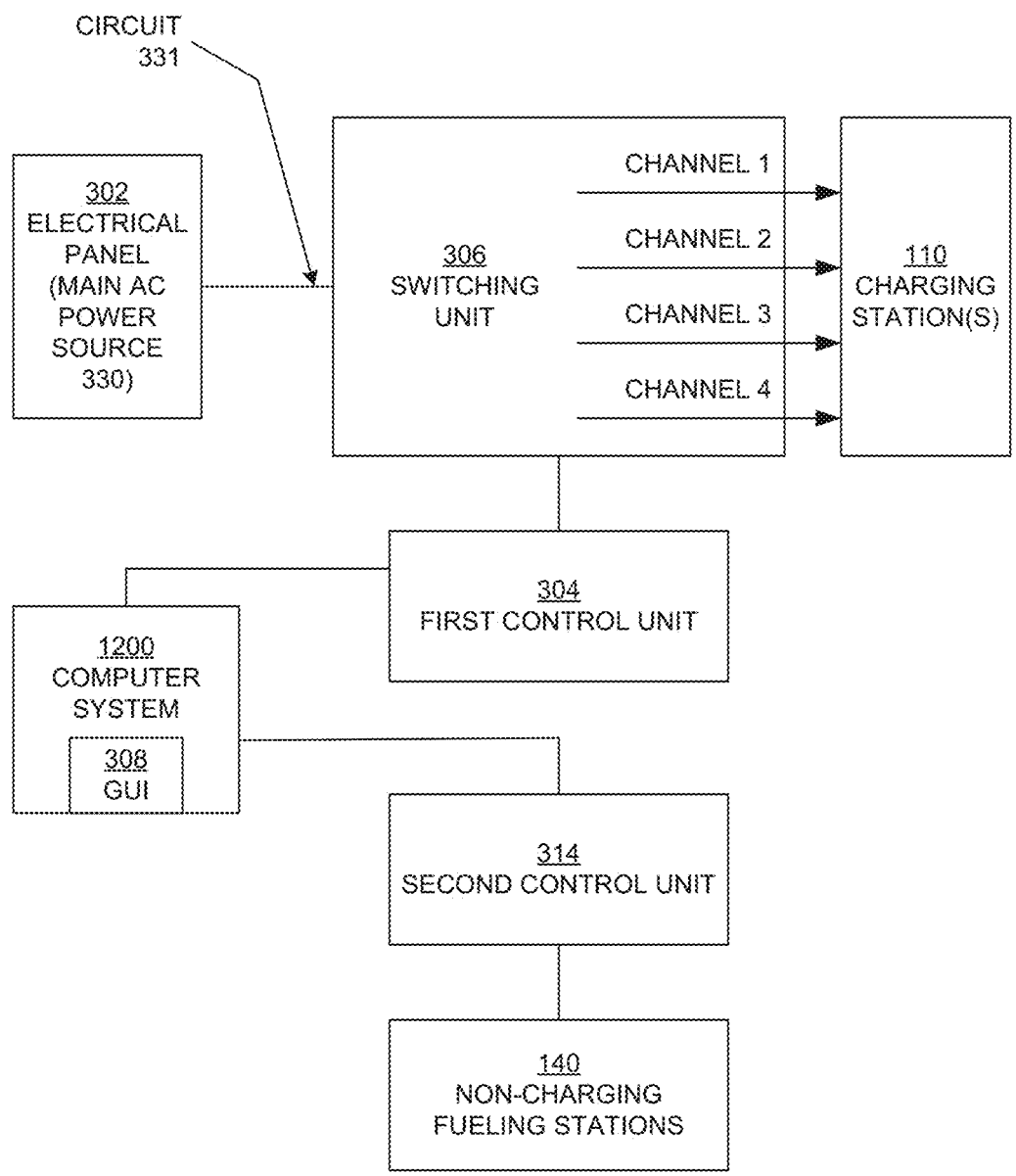
FIG. 3 is a block diagram illustrating elements of an integrated fuel management system in an embodiment according to the invention.

FIG. 3 is a block diagram illustrating elements of the integrated fuel management system 106 in embodiments according to the invention.

In embodiments, the integrated fuel management system 106 includes a first control unit 304 and a switching unit 306 connected to the first control unit. In embodiments, the control unit 304 provides, manages, and controls secure, automated access to one or more EV charging stations 110. The control unit 304 can also be in communication with the computer system 1200, either through a wired connection or a wireless connection, directly or over the Internet. The control unit 304 can include, for example, a magnetic stripe card reader, a radio frequency identification (RFID) proximity key and card reader, an alphanumeric keypad, vehicle tags, and a bar code scanner.

In an embodiment, main power is delivered over a dedicated circuit 331 from an electrical panel 302 (e.g., from the main AC power source 330) to the switching unit 306. Only a single power circuit is illustrated; however, the present invention is not so limited. In other words, multiple such systems can be implemented in parallel.

In the embodiments of FIG. 3, the switching unit 306 has four channels: channels 1, 2, 3, and 4 (1-4). Depending on the implementation, each channel can be connected to a respective charging station 110 (FIG. 1), or each channel can be connected to a respective output connection.

In embodiments, the integrated fuel management system 106 also includes a second control unit 314. In embodiments, the second control unit 314 provides, manages, and controls secure, automated access to one or more non-electric fueling stations 140.

The integrated fuel management system 106 can include more than two control units.

As mentioned above, communication between the integrated fuel management system 106 and a computer system 1200 may be implemented using a wired and/or wireless connection, and may occur directly and/or over the Internet or an intranet (e.g., an Ethernet or local area network). Also, the computer system 1200 is connected (wired or wirelessly) to the first control unit 304 and to the second control unit 314. The first control unit 304 provides state information for the EV charging station 110 to the computer system 1200, and the second control unit 314 provides state information for the non-electric fueling station to the computer system.

In embodiments, the computer system 1200 generates and/or executes a graphical user interface (GUI) 308 using the state information from the first control unit 304 and the second control unit 314.

The GUI 308 is a browser-based interface that utilizes current basic functions of the browser plus additional functionality that can be used to manage and monitor the multivehicle fueling system 100 (FIG. 1). Each charging station 110 and non-charging station 140 can be monitored and controlled (programmed) over a network.

The GUI 308 can be accessed by a network administrator and can also be accessed by or pushed to other devices such as smartphones. In general, the state information for the multivehicle fueling system 100 can be cloud-based and available online.

Furthermore, some or all of the GUI 308 can be accessed remotely from another computer system or a device such as a smartphone, or information from the GUI can be pushed to remote devices such as other computer systems and smartphones. Also, in an embodiment, information from a smartphone or computer system, including a computer system or similar type of intelligent device on an EV or non-EV, is received via the browser-based interface and used, for example, to control fueling/charging or to provide billing information to the owner or manager of the multivehicle fueling system 100.

The GUI 308 presents information based on the analysis of the data provided by the integrated fuel management system 106. For example, a convenient dashboard summary can be implemented to display important fleet data and useful alert messages, comparative usage charts, and inventory information.

More specifically, the integrated fuel management system 106 collects data from each fuel transaction. Users can look at the data in real time. The fuel management system communicates via network cable or wireless connection to the cloud. This information can be accessed through a user's account on any device using a Web browser. The dashboard provides users with trend graphs depicting fuel usage in, for example, the last 30 days. Customization is available to view the total amount of transactions, product usage, and inventory. This allows users to see any zero quantity or bypass transactions. Each user can customize the time period of transactions (e.g., a year, month, week, day, etc.) and the information that is important for the user to see. Information can be exported to other applications to create custom reports. Users can authorize vehicles and drivers at the press of a button. Administrators can manage active and inactive drivers and vehicles in real time. If needed, an administrator has the ability to remotely (e.g., with an Internet connection) add new vehicles and drivers, so they may be authorized to fuel (e.g., during a holiday). Administrators have the ability to limit volume, dollar amount, and number of fuel transactions per day, week, and month, for example. Periodic (e.g., weekly or monthly) reports that allow for flexible billing, fuel usage summaries, or detailed reports can be received automatically.

Thus, the integrated fuel management system 106 combines a flexible platform that can manage fuels of all types (e.g., including liquid fuel such as gasoline) with technologies (e.g., the switching unit 306) that can manage electrical power and EV charging. The integrated fuel management system 106 provides timely access control, uniform billing, detailed cloud-based reporting, power metering and control, and power utilization reporting tools. The integrated fuel management system 106 may perform other functions, such as metering of power usage and storage of information related to charging events.

Figure 4:
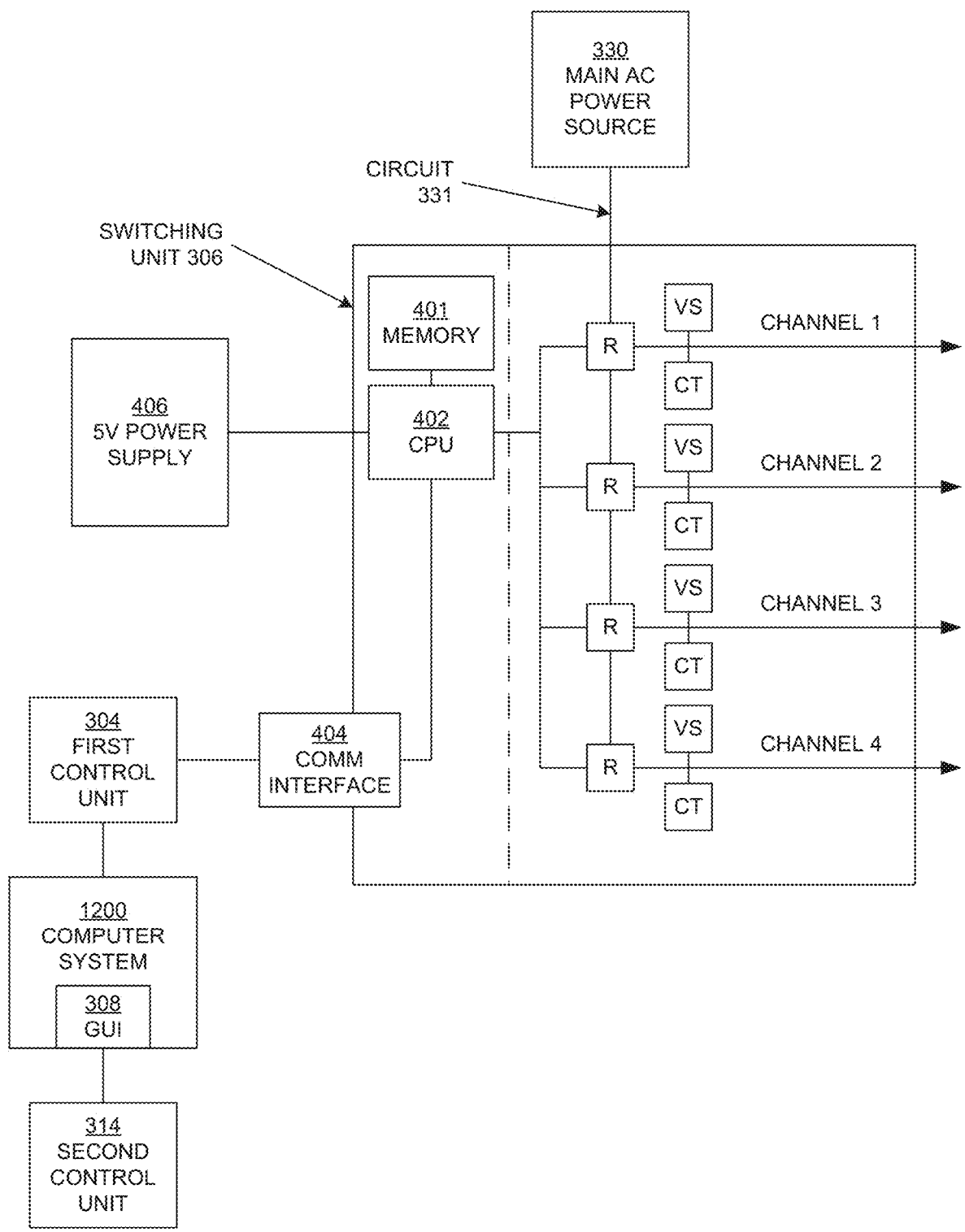
FIG. 4 is a block diagram further illustrating elements of an integrated fuel management system in an embodiment according to the invention.

FIG. 4 is a block diagram further illustrating elements of the integrated fuel management system 106 in embodiments according to the invention. In the example of FIG. 4, the switching unit 306 includes a processor (e.g., a central processing unit (CPU)) 402 that can be coupled to control unit 404 via a communication interface 404. The switching unit 306 can be implemented on a single printed circuit board (PCB) that has a low voltage side (e.g., containing the CPU) and a separate high voltage side (the main power side). In an embodiment, the processor 402 is powered by a separate, low voltage (e.g., five volt, 5V) power supply 406. In an embodiment, the switching unit 306 includes memory 401, which can be used to store information related to charging events, for example.

The main AC power source 330 is connected to each of the channels 1-4 by a respective relay R or switch that is individually controlled by the processor 402 in response to switching commands from the control unit 304. A status indicator (e.g., a light-emitting diode) can be associated with each channel to indicate the status of the relay (e.g., open or closed).

By turning on and off the relay or switch, a charging current is provided to a first one of the channels, the charging current to the first one of the channels is then turned off, a charging current is then provided to a second one of the channels, and so on. More specifically, for example, a charging procedure includes providing a charging current to a first one of the channels, turning off that charging current when an interval of time expires or when a charging threshold is reached, then providing a charging current to a second one of the channels, and so on. Also, in various embodiments, a charging procedure includes providing a charging current to each of the channels one channel at a time in round-robin fashion, and/or a channel is designated as a priority channel, in which case a charging current is provided to the priority channel more frequently than to other channels. Many different charging sequences or procedures can be used.

In an embodiment, each of the channels 1-4 includes a respective current sensor CT and a respective voltage sensor VS. Accordingly, the switching unit 306 can detect whether an electrical load (e.g., an EV) is connected to a channel before a charging current is provided to the channel. In an embodiment, the switching unit 306 can also detect a charge signature for an EV connected to a channel before a charging current is provided to the channel; if the charge signature indicates that the EV does not require further charging (e.g., it is fully charged), then the charging current is not provided to the channel.

Figure 5:
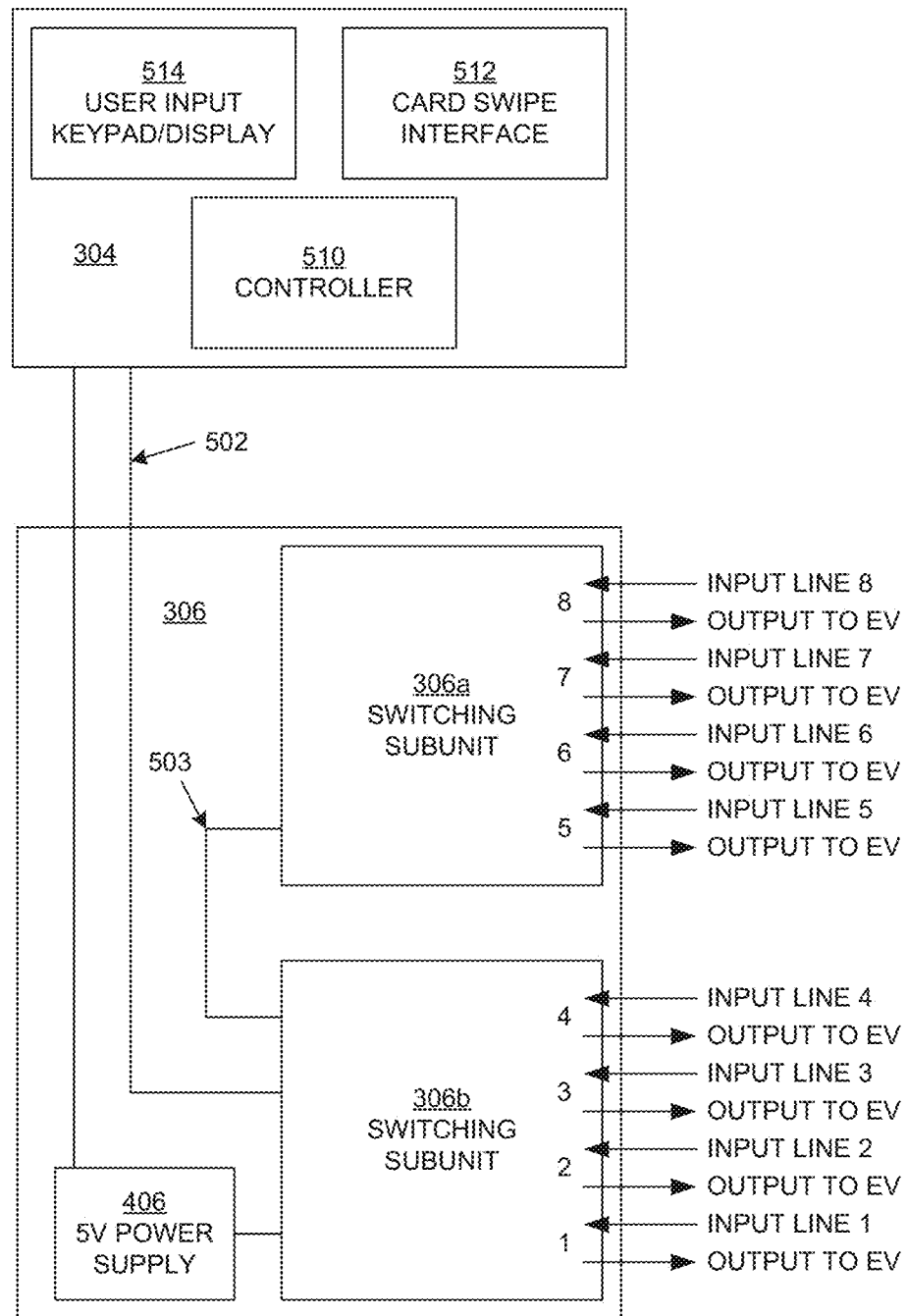
FIG. 5 illustrates a control unit and a switching unit of the integrated fuel management system in an embodiment according to the invention.

FIG. 5 illustrates the control unit 304 and the switching unit 306 of the integrated fuel management system 106 in an embodiment according to the present invention. In an embodiment, the control unit 304 and the switching unit 306 are connected by a cable 502 (e.g., an Ethernet RJ45 patch cable).

In an embodiment, the switching unit 306 includes two subunits 306a and 306b. The cable 502 is connected to the subunit 306a, which is connected to the subunit 306b via the cable 503 (e.g., an Ethernet RJ45 patch cable).

In embodiments, the control unit 304 and the switching unit 306 are both coupled to the 5V power supply 406. In an embodiment, the subunit 306a is connected to the power supply 406 and powers the subunit 306b via a controller area network (CAN) bus (see FIG. 6). The 5V power supply 406 can also be used to power the control unit 304.

Each of the subunits 306a and 306b of FIG. 5 includes four channels: channels 1-4 and 5-8, respectively. Thus, for example, each of the subunits 306a and 306b is exemplified by the switching unit 306 of FIG. 4. However, the invention is not so limited.

In FIG. 5, the lines labeled "input line 1," "input line 2," etc., are connected to the main AC power source 330. In the embodiment of FIG. 5, each channel is connected via the line labeled "output" to a respective EV and there is a one-to-one correspondence between the input lines and the channels. In another embodiment, a single input line is connected to multiple channels and power is delivered to each channel in, for example, round-robin fashion.

In embodiments, the control unit 304 includes a controller (control board) 510 and, in the example of FIG. 5, a card swipe interface 512 (e.g., a magnetic stripe card reader) and a user input keypad/display 514 (e.g., an alphanumeric keypad). The control unit 304 can also include, for example, a radio frequency identification (RFID) proximity key and card reader (not shown). The controller 510 issues switching commands for each channel to the switching unit 306. In an embodiment, the switching commands are initiated by an application 1240 executing on the computer system 1200 (FIG. 12) and communicated to the control unit 304 (the controller 510) over a connection as described above. The switching commands control, for example, the relays in the switching unit 306 (FIG. 4). The switching unit 306 executes those commands and reports state information for each channel to the control unit 304. The state information includes, but is not limited to, the switch state of each channel (e.g., on or off), the current or amperage per channel, the voltage per channel, and the frequency per channel. The control unit 304, in turn, can send the state information to the computer system 1200 over a connection as described above. The computer system 1200 can display the state information in the GUI 308 (FIG. 4).

In embodiments, the control unit 314 of FIG. 3, for example, is configured in a similar manner as the control unit 304. Thus, the control unit 314 used for monitoring and managing non-charging fueling stations can also include a controller (control board), a card swipe interface, and a user input keypad/display.

Figure 6:
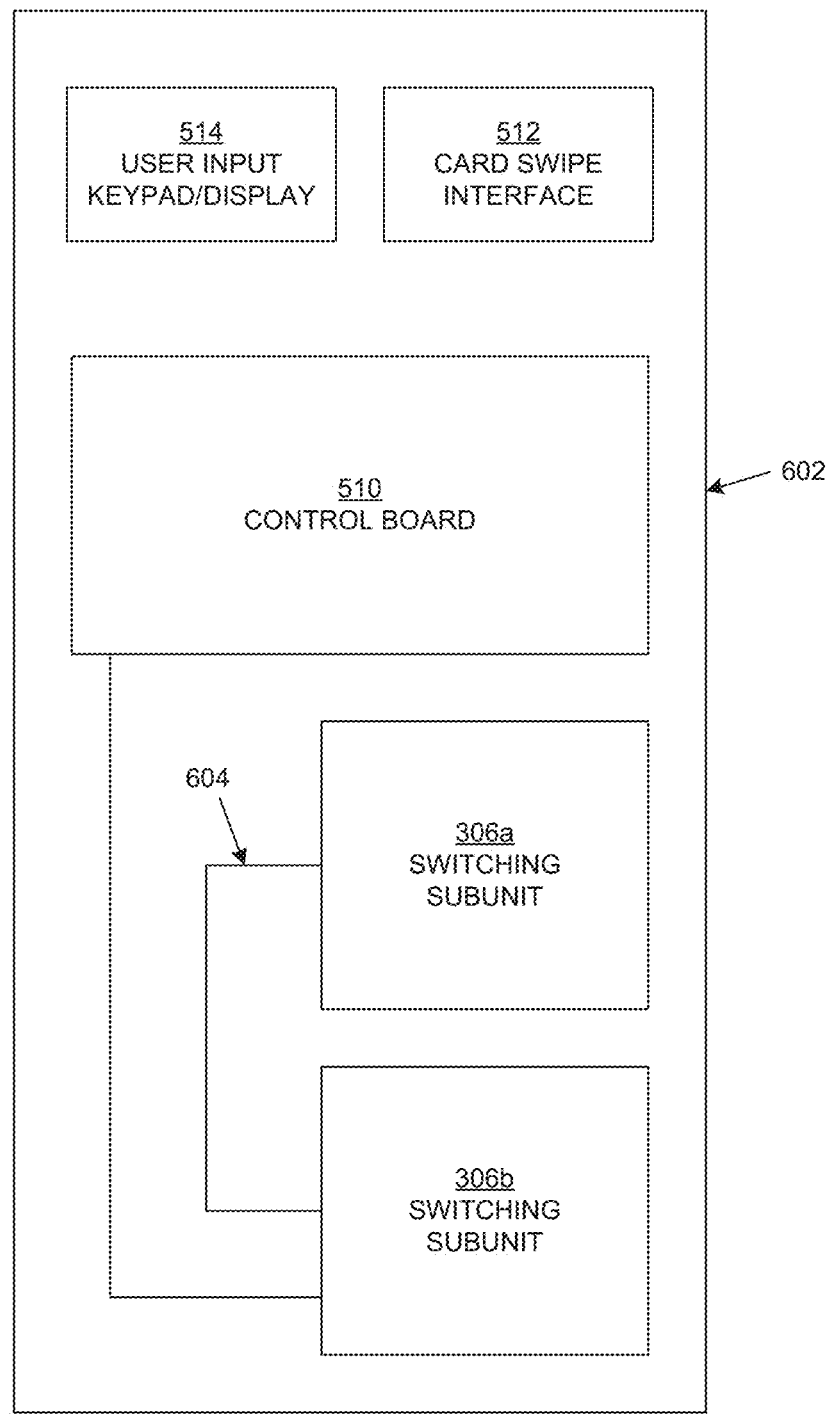
FIG. 6 illustrates a control unit and a switching unit of the integrated fuel management system in an embodiment according to the invention.

FIG. 6 illustrates the control unit 304 and the switching unit 306 of the integrated fuel management system 106 in an embodiment according to the present invention. In this embodiment, the control unit 304 and the switching unit 306 are enclosed within a single unit or housing 602. In practice, the control unit 304 and the switching unit 306 are covered by a panel (not shown). As mentioned above in conjunction with FIG. 5, in an embodiment, the subunit 306a is connected to the 5V power supply and powers the subunit 306b via a CAN bus 604.

Figure 7:
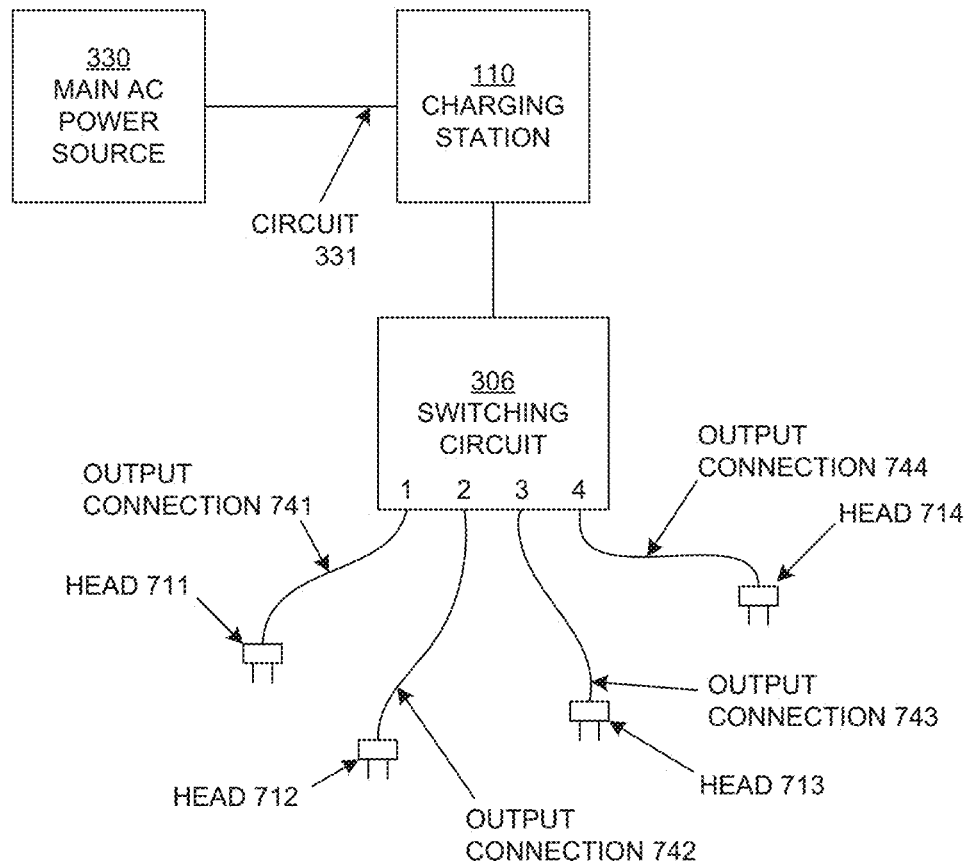
FIG. 7 is a block diagram illustrating an example of an implementation of a multivehicle charging system in an embodiment according to the invention.

FIG. 7 is a block diagram illustrating an example of an implementation of a multivehicle charging system in an embodiment according to the invention. In the example of FIG. 5, a charging station 710 is connected to an electrical panel (the main AC power source 330) via a single (dedicated) circuit 331, and is also connected to the switching circuit 306. Each of the channels 1-4 of the switching circuit 306 is connected to a respective one of the output connections 741, 742, 743, and 744 (741-744), which in turn are connected to heads 711, 712, 713, and 714 (711-714), respectively. In this implementation, the integrated fuel management system 106 directs a charging current to the output connections 741-744, one at a time as described above, and thus also directs a charging current to the heads 711-714, one at a time.

Figure 8:
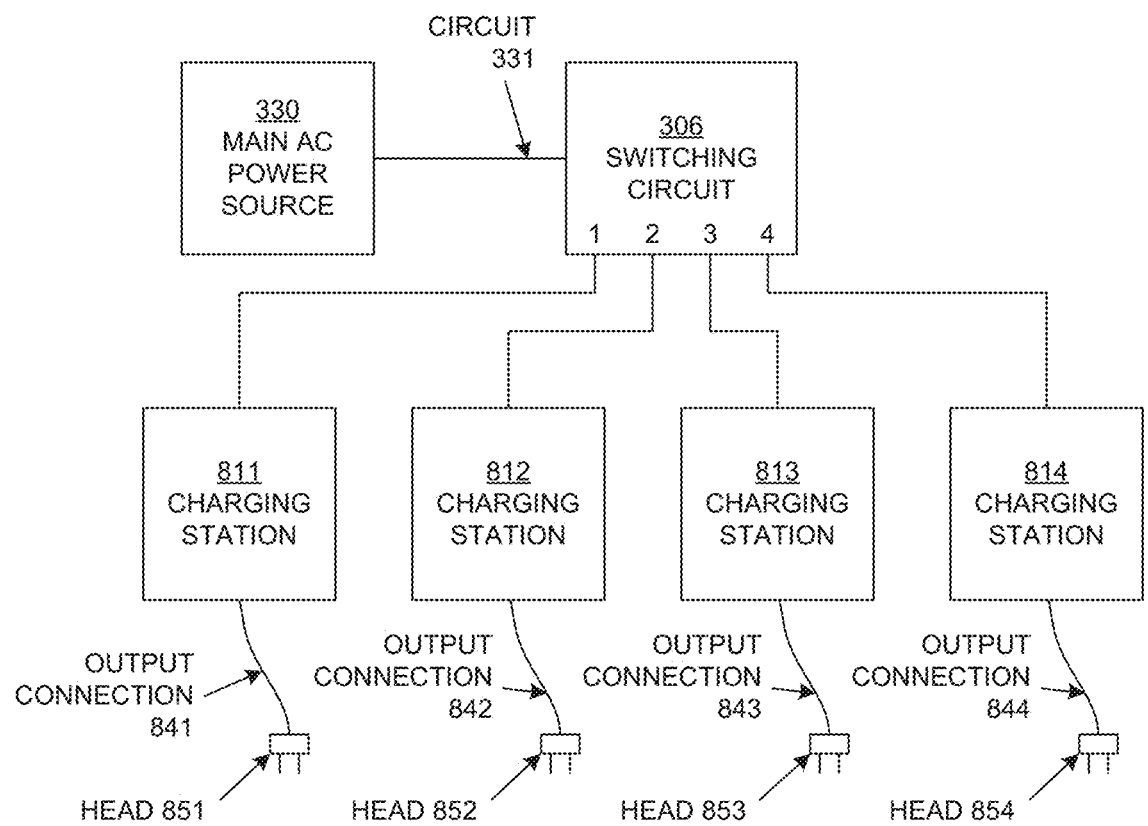
FIG. 8 is a block diagram illustrating an example of an implementation of a multivehicle charging system in an embodiment according to the invention.

FIG. 8 is a block diagram illustrating an example of another implementation of a multivehicle charging system in an embodiment according to the invention. In the example of FIG. 8, the switching circuit 306 is connected to an electrical panel (the main AC power source 330) via a single (dedicated) circuit 331. Each of the channels 1-4 of the switching circuit 306 is connected to a respective charging station 811, 812, 813, and 814 (811-814), which in turn are connected to heads 851, 852, 853, and 854 (851-854), respectively, by a respective output connection 841, 842, 843, or 844 (841-844). In the FIG. 8 implementation, the integrated fuel management system 106 directs a charging current to the channels 1-4 one at a time, and hence to the charging stations 811-814 one at a time, and thus also directs a charging current to the output connections 841-844 and the heads 851-854, one at a time.

Figure 9:
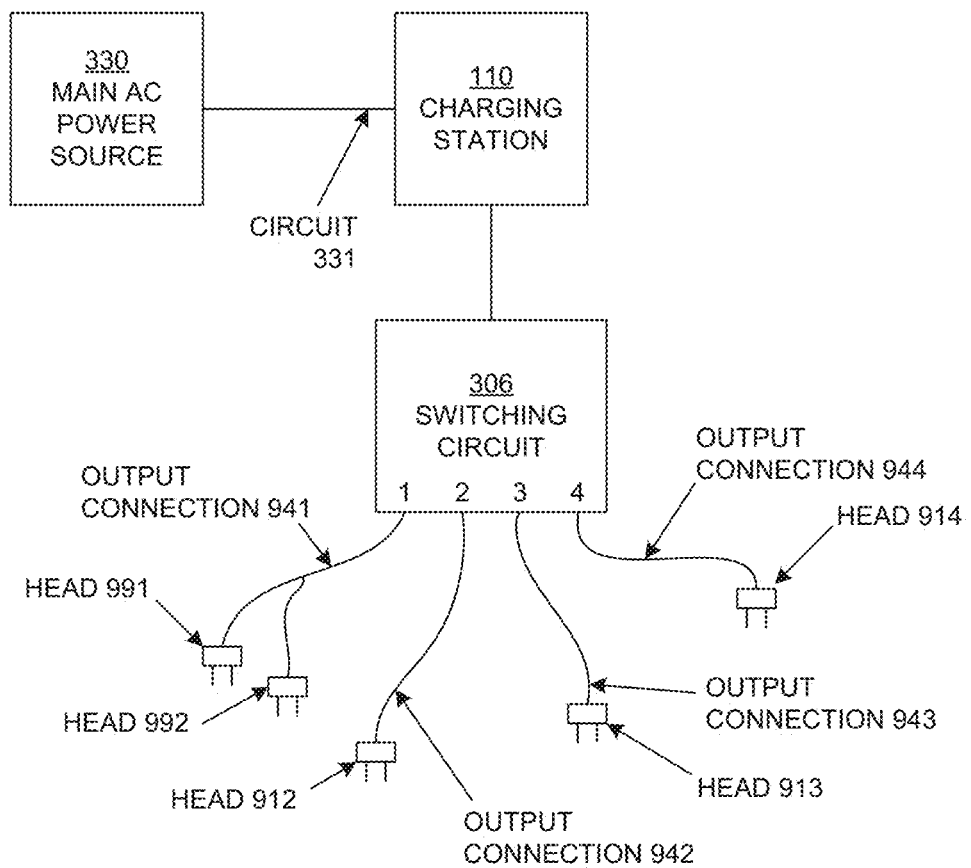
FIG. 9 is a block diagram illustrating an example of an implementation of a multivehicle charging system in an embodiment according to the invention.

FIG. 9 is a block diagram illustrating an example of an implementation of a multivehicle charging system in an embodiment according to the invention. The FIG. 9 embodiment is similar to the embodiment of FIG. 7, except that the charging station 910 has at least one output connection (e.g., the output connection 941) that has more than one (e.g., two) heads 951 and 952. When the charging current is directed to the output connection 941, it is split between the heads 951 and 952.

Figure 10:
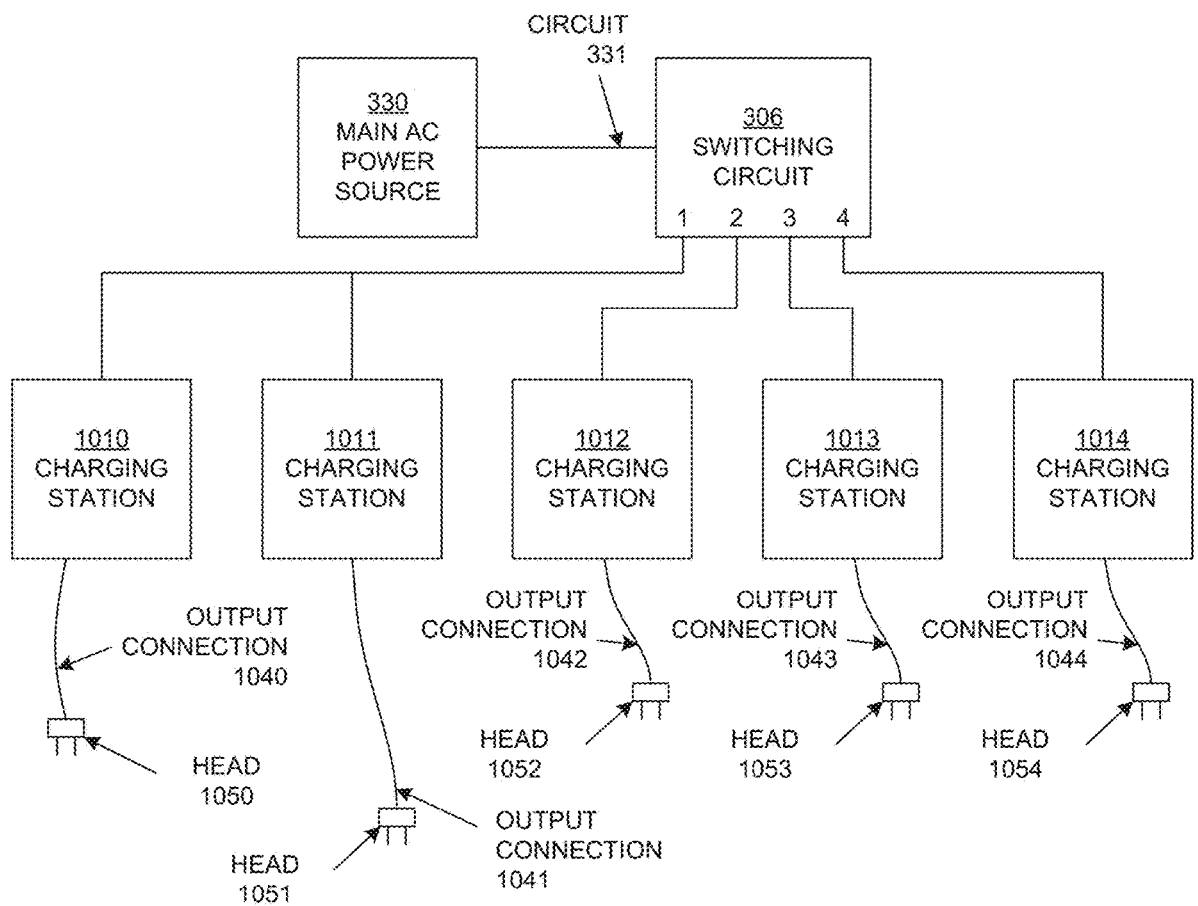
FIG. 10 is a block diagram illustrating an example of an implementation of a multivehicle charging system in an embodiment according to the invention.

FIG. 10 is a block diagram illustrating an example of another implementation of a multivehicle charging system in an embodiment according to the invention. The FIG. 10 embodiment is similar to the embodiment of FIG. 8, except that at least one of the channels in the switching circuit 306 (e.g., channel 1) is connected to two charging stations 1010 and 1011. The charging station 1010 is connected to an output connection 1040, which is connected to the head 1050, and the charging station 1011 is connected to the output connection 1041, which is connected to the head 1042. In this embodiment, the integrated fuel management system 106 directs a charging current to the channels 1-4, one channel at a time. However, when the charging current is directed to channel 1, that charging current can be split between the charging stations 1010 and 1011, and thus ultimately the charging current to channel 1 can be split between the output connections 1040 and 1041 and hence between the heads 1050 and 1051.

Any combination of the implementations of FIGS. 7-10 can be deployed within the same multivehicle fueling system.

Figure 11:
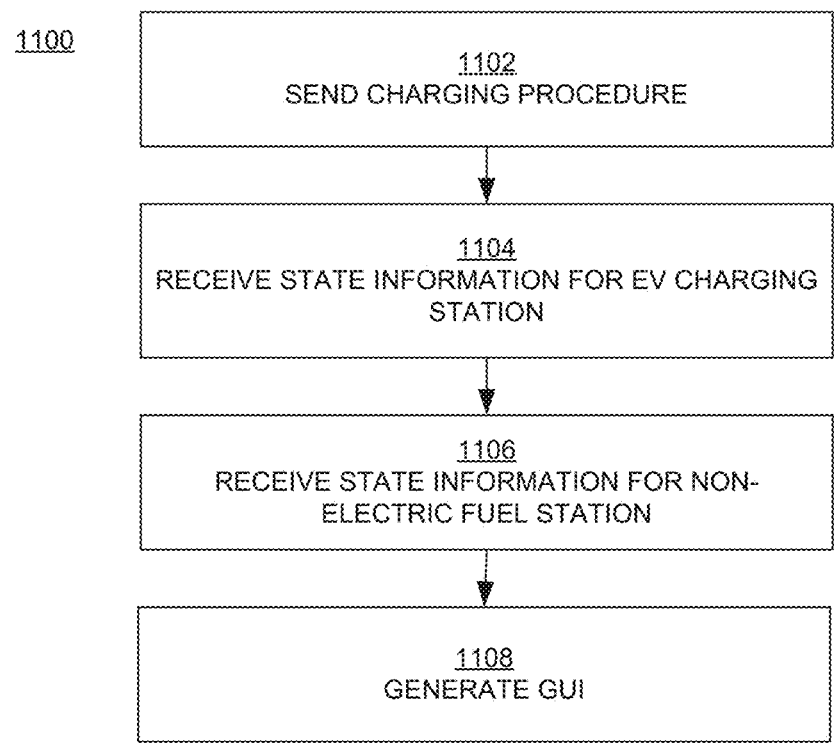
FIG. 11 is a flowchart illustrating examples of computer-implemented operations for monitoring and managing a multivehicle fueling system in embodiments according to the invention.

FIG. 11 is a flowchart 1100 illustrating examples of operations for monitoring and managing a multivehicle fueling system in embodiments according to the present invention. The flowchart 1100 of FIG. 11 can be implemented in a multivehicle charging system such as those described above. In embodiments, the operations of the flowchart 1100 are implemented using the computer system 1200 of FIG. 12, specifically by an application 1240 executing on the computer system.

In block 1102 of FIG. 11, a charging procedure is sent to a first control unit coupled to a switching unit of an EV charging station. The charging stating includes multiple output connections that can be connected to EVs. The switching unit can direct a charging current from an input power supply to an output connection in response to commands from the first control unit that are issued according to the charging procedure.

In block 1104, state information for the EV charging station is received from the first control unit.

In block 1106, state information for a non-charging fueling station is received from a second control unit.

In block 1108, the state information for the EV charging station and the state information for the fueling system is analyzed and processed, and a GUI using the state information is generated and displayed.

Figure 12:
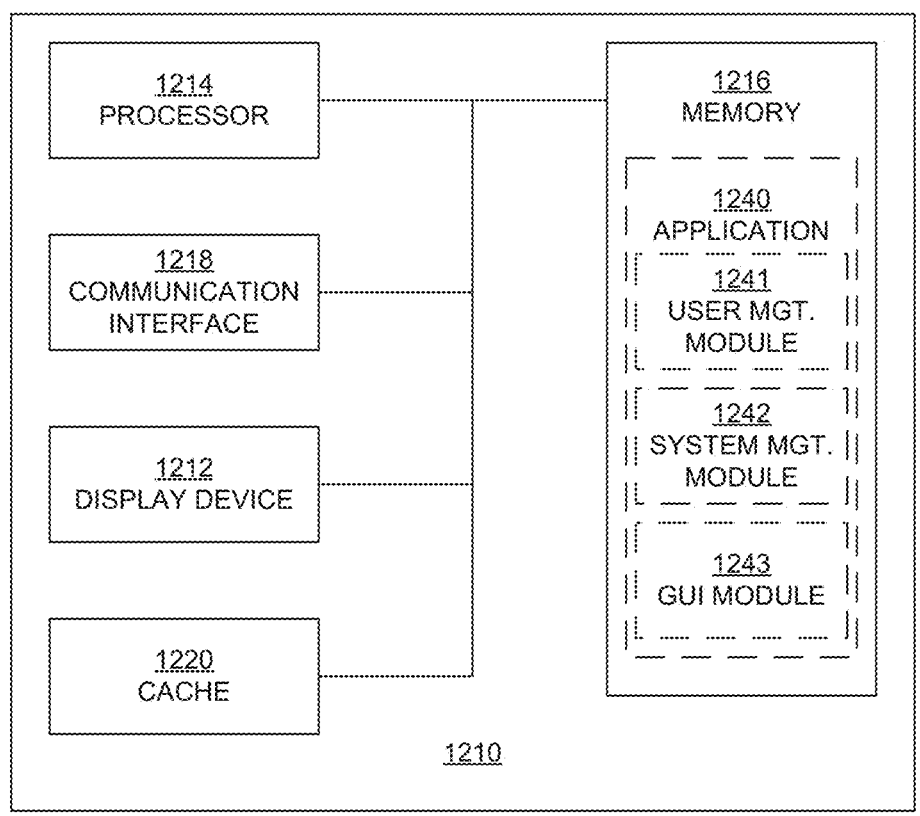
FIG. 12 is a block diagram of an example of a computing device or computer system capable of implementing embodiments according to the invention.

FIG. 12 is a block diagram of an example of a computing device or computer system 1210 capable of implementing embodiments according to the present invention. The device 1210 broadly includes any single or multi-processor computing device or system capable of executing computer-readable instructions, such as those described above. In its most basic configuration, the device 1210 may include at least one processing circuit (e.g., the processor 1214) and at least one non-volatile storage medium (e.g., the memory 1216).

The processor 1214 generally represents any type or form of processing unit or circuit capable of processing data or interpreting and executing instructions. In certain embodiments, the processor 1214 may receive instructions from a software application or module (e.g., the application 1240). These instructions may cause the processor 1214 to perform the functions of one or more of the example embodiments described and/or illustrated above.

The system memory 1216 generally represents any type or form of volatile or non-volatile storage device or medium capable of storing data and/or other computer-readable instructions. Examples of system memory 1216 include, without limitation, RAM, ROM, flash memory, or any other suitable memory device. In an embodiment, the system memory 1216 includes a cache 1220.

The device 1210 may also include one or more components or elements in addition to the processor 1214 and the system memory 1216. For example, the device 1210 may include a memory device, an input/output (I/O) device such as a keyboard and mouse (not shown), and a communication interface 1218, each of which may be interconnected via a communication infrastructure (e.g., a bus). The device 1210 may also include a display device 1212 that is generally configured to display a GUI such as those described below. The display device 1212 may also include a touch sensing device (e.g., a touch screen).

The communication interface 1218 broadly represents any type or form of communication device or adapter capable of facilitating communication between the device 1210 and one or more other devices. The communication interface 1218 can include, for example, a receiver and a transmitter that can be used to receive and transmit information (wired or wirelessly), such as information from and to the charging stations in a multivehicle charging system or network and information from and to other devices such as a smartphone or another computer system.

The device 1210 can execute an application 1240 that allows it to perform operations including the operations and functions described herein (e.g., the operations of the integrated fuel management system 106, including the operations of FIG. 11). A computer program containing the application 1240 may be loaded into the device 1210. For example, all or a portion of the computer program stored on a computer-readable medium may be stored in the memory 1216. When executed by the processor 1214, the computer program can cause the processor to perform and/or be a means for performing the functions of the example embodiments described and/or illustrated herein. Additionally or alternatively, the example embodiments described and/or illustrated herein may be implemented in firmware and/or hardware.

The application 1240 can include various software modules that perform the functions that have been described herein. For example, the application can include a user management module 1241, a system management module 1242, and a GUI module 1243.

The user management module 1241 can perform functions such as, but not limited to: setting up user accounts that authorize users to use the multivehicle fueling system; authenticating users; metering fuel or electrical power consumed by each user; determining fuel efficiency (e.g., miles per gallon, or equivalent miles per gallon for EVs and hybrids); and optionally billing users.

The system management module 1242 can perform functions such as, but not limited to: monitoring the availability and functionality of fueling system components such as circuits, channels, output connections, heads, charging stations, and liquid fueling stations; controlling (e.g., turning on and off) such components; monitoring charge signatures and charging periods; collecting and logging fueling system information; and performing diagnostics.

Figure 13:
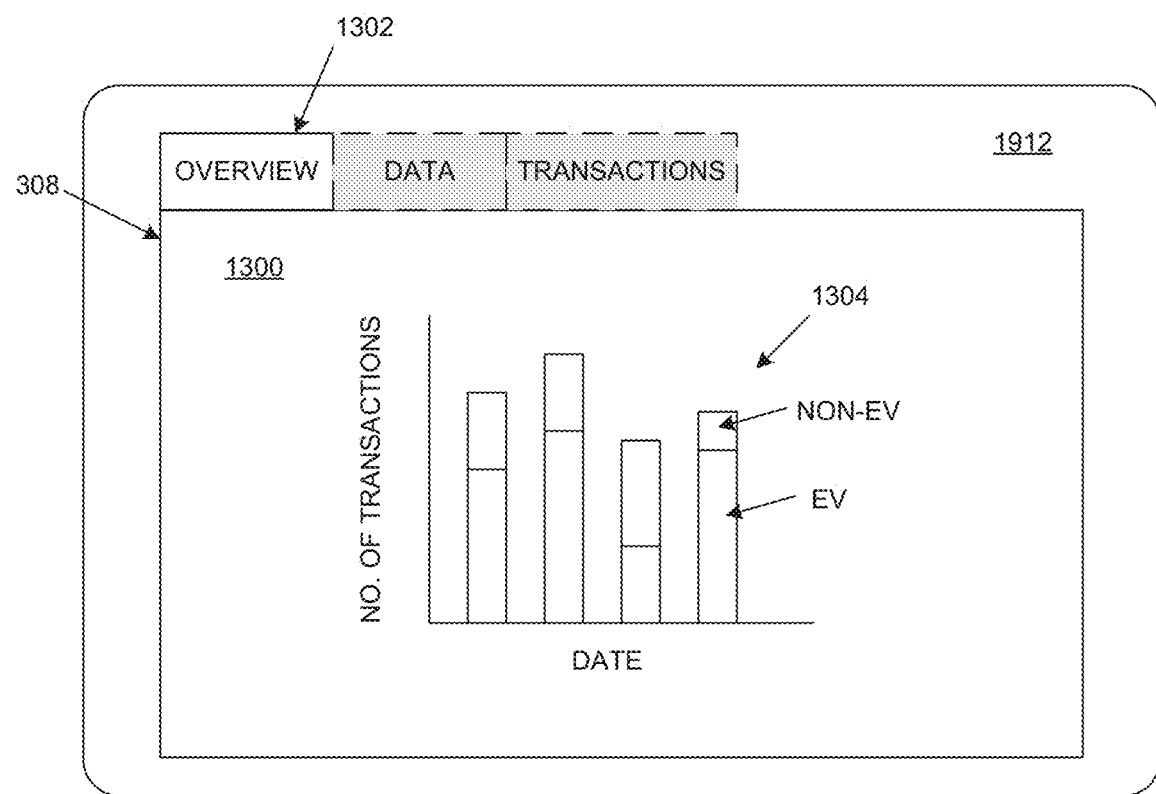
FIGS. 13, 14, and 15 illustrate examples of displays that constitute selected elements of a graphical user interface (GUI) that is rendered on a display device in embodiments according to the invention.
Figure 14:
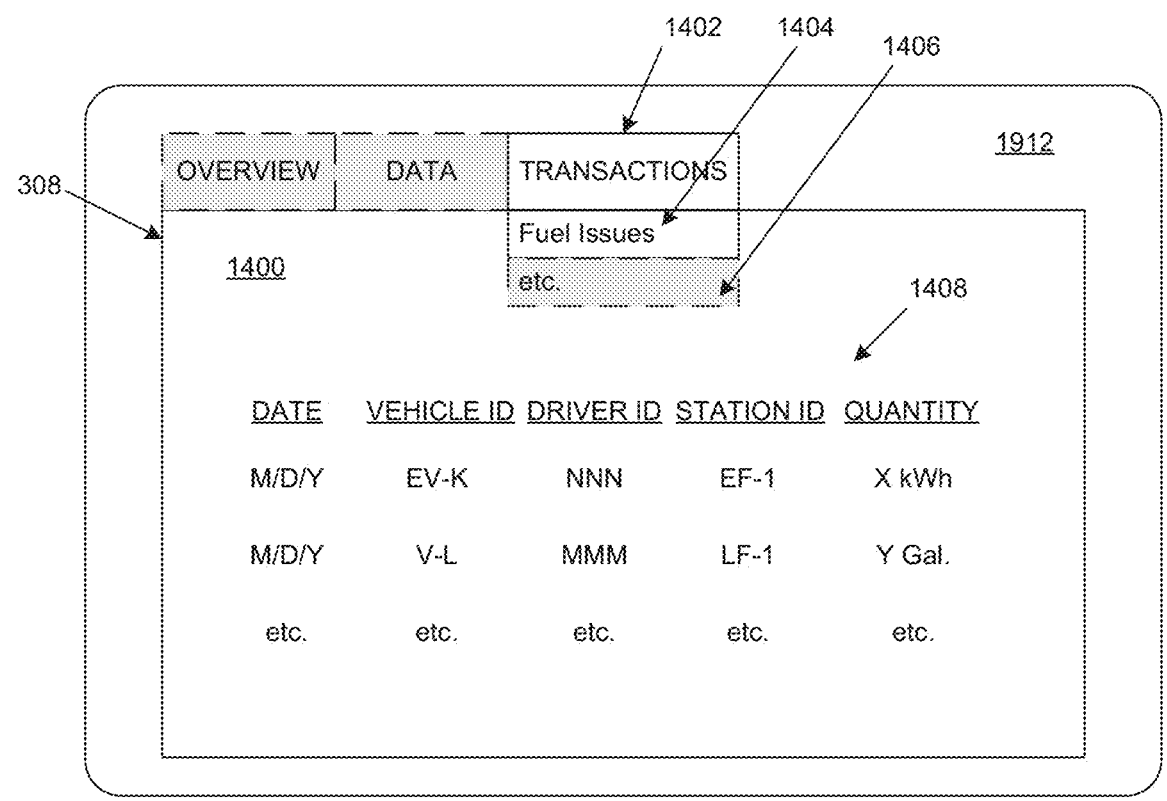
Figure 15:
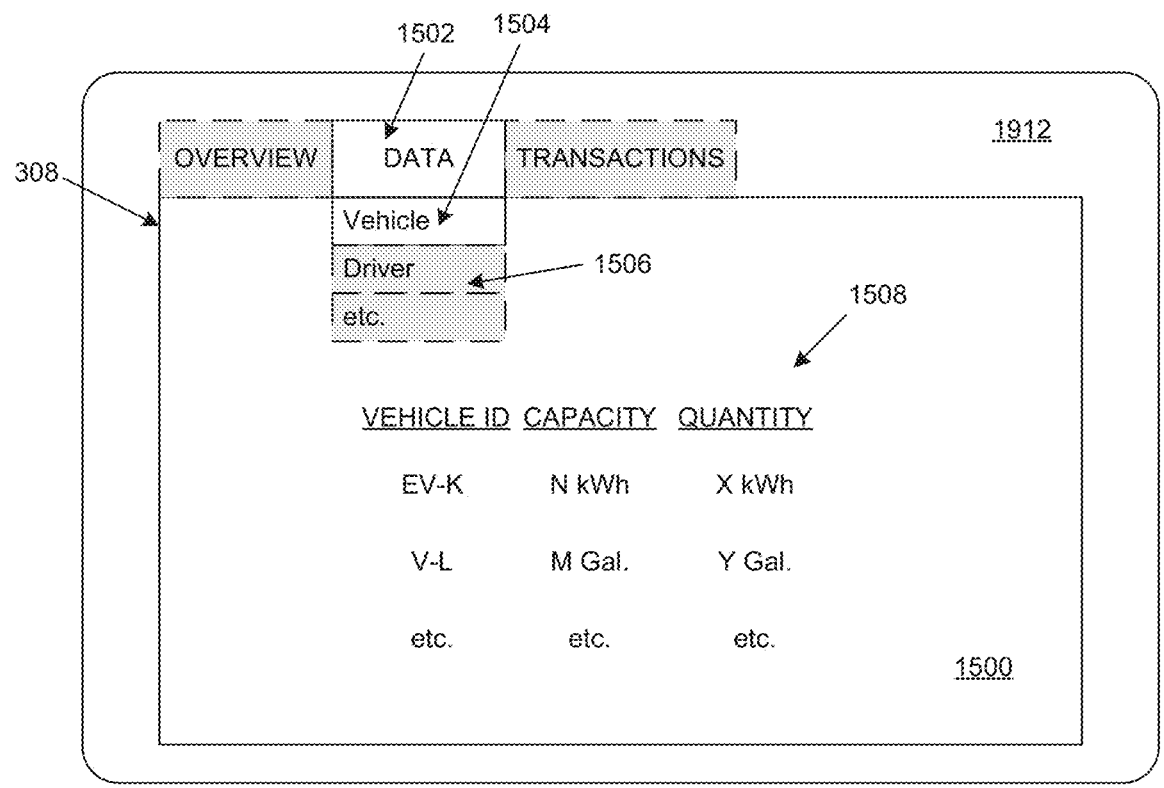

The GUI module 1243 can perform functions such as, but not limited to, generating a GUI that can be accessed by a network administrator and can also be accessed by or pushed to other devices such as smartphones FIGS. 13, 14, and 15 illustrate examples of displays that constitutes selected elements of the GUI 308 (FIG. 3) that are rendered on a display device 1212 (FIG. 12) in embodiments according to the invention. The displays shown in these examples may be full-screen displays, or they may be windows in a full-screen display. The displays may be displayed individually, or multiple displays may be displayed at the same time (e.g., side-by-side). The displays shown and described below are examples only, intended to demonstrate some of the functionality of the GUI 308. The present invention is not limited to these types or arrangements of displays.

FIG. 13 illustrates an example of a display 1300 that is opened and presented when the tab 1302 (e.g., "Overview") in the GUI 308 is selected. In this example, the display 1300 includes a graph 1304 of the number of fueling transactions per day. The transactions may include both EV charging transactions and non-EV fueling transactions, in which case the data presented in the graph may be separated by the type of transaction as illustrated in the example.

FIG. 14 illustrates an example of a display 1400 that is opened and presented when the tab 1402 and menu item 1404 (e.g., "Transactions" and "Fuel Issues," respectively) in the GUI 308 are selected. More specifically, in this example, when the tab 1402 is selected, a dropdown menu that includes a list of items (e.g., the menu items 1404 and 1406) is displayed. The menu item 1404 can be selected to open the display 1400. The display 1400 includes, for example, a table 1408 that lists fueling transactions by date, vehicle identifier (ID), driver ID, fueling station ID, and quantity. The transactions may include both EV charging transactions and non-EV fueling transactions as illustrated in the table 1408.

FIG. 15 illustrates an example of a display 1500 that is opened and presented when the tab 1502 and menu item 1504 (e.g., "Data" and "Vehicle," respectively) in the GUI 308 are selected. More specifically, in this example, when the tab 1502 is selected, a dropdown menu that includes a list of items (e.g., the menu items 1504 and 1506) is displayed. The menu item 1504 can be selected to open the display 1500. The display 1500 includes a table 1508 that lists vehicles that are in the fleet or are otherwise authorized to use the stations in the multivehicle fueling system. The table 1508 also includes, for example, the capacity of each vehicle and the quantity of fuel (electric or other) obtained in the most recent fueling transaction.

Embodiments according to the present invention thus provide an integrated fuel management system for EV charging and non-EV fueling. The integrated fuel management system combines a flexible platform for managing fuels (e.g., fleet fuels) of all types, including electrical power. The integrated fuel management system includes timely access control, uniform departmental billing, and detailed cloud-based reporting. The technologies for managing electrical power and EV charging management and control include electrical infrastructure optimization, power metering and control, and a myriad of power utilization reporting tools. The combination integrates EV charging from any charging station into a total fuel management system using controllers and power management systems. The result is a solution that manages all electrical power dynamics as part of an integrated, full-featured fuel management system. Consequently, electricity for EV charging can be managed as a standard fleet fuel.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., storage as a service, software as a service, platform as a service, infrastructure as a service, etc.) may be accessible through a Web browser or other remote interface. Various functions described herein may be provided through a remote desktop environment or any other cloud-based computing environment.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the following claims.

What is claimed is:

1. An integrated fuel management system, comprising:
    a switching unit coupled to an electric vehicle (EV) charging station;
    a computer system;
    a first control unit coupled to the switching unit and operable for providing state information for the EV charging station to the computer system; and
    a second control unit coupled to a non-electric fueling station for types of vehicles other than EVs, wherein the second control unit is operable for providing state information for the non-electric fueling station to the computer system, and wherein the computer system is operable for displaying the state information for the EV charging station and for displaying the state information for the non-electric fueling station.

2. The integrated fuel management system of claim 1, wherein the switching unit and the first control unit are coupled by wires within a single unit.

3. The integrated fuel management system of claim 1, wherein the switching unit comprises a plurality of channels, the switching unit further comprising:
    a first subunit comprising a first subset of the plurality of channels; and
    a second subunit comprising a second subset of the plurality of channels.

4. The integrated fuel management system of claim 1, wherein the first control unit comprises a component selected from the group consisting of: a card swipe interface; a radio frequency identification (RFID) proximity key and card reader; and an alphanumeric keypad.

5. The integrated fuel management system of claim 1, wherein the state information for the EV charging station comprises data per charging transaction.

6. The integrated fuel management system of claim 1, wherein the EV charging station comprises a plurality of output connections, and wherein the state information for the EV charging station comprises amperages versus time of charging currents for each output connection of the plurality of output connections.

7. The integrated fuel management system of claim 1, wherein the switching unit comprises a central processing unit (CPU) coupled to a printed circuit board, wherein the printed circuit board comprises a lower voltage side that powers the CPU, wherein the printed circuit board also comprises a higher voltage side that is operable to receive a charging current delivered from an input power supply, and wherein the lower voltage side is operable to receive power from a lower voltage power supply that is separate from the input power supply.

8. The integrated fuel management system of claim 1, wherein the EV charging station comprises a plurality of output connections, wherein each output connection of the plurality of output connections is couplable to a respective EV, and wherein the switching unit is operable for directing a charging current from an input power supply to an output connection of the plurality of output connections in response to commands from the first control unit that are issued according to a charging procedure.

9. A fueling system, comprising:
    an electric vehicle (EV) charging station;
    a non-charging fueling station for types of vehicles other than EVs; and
    an integrated fuel management system coupled to the EV charging station and to the non-charging fueling station;
    wherein the integrated fuel management system is operable for receiving first state information from the EV charging station, for receiving second state information from the non-charging fueling station, and for generating a graphical user interface (GUI) configured to present information comprising the first state information and to present information comprising the second state information.

10. The fueling system of claim 9, wherein the integrated fuel management system comprises a computer system operable for generating the GUI.

11. The fueling system of claim 9, wherein the EV charging station comprises a switching unit comprising a plurality of channels, wherein each channel of the plurality of channels is coupled to a respective output connection that is couplable to a respective EV; and wherein the switching unit further comprises:
    a first subunit comprising a first subset of the plurality of channels; and
    a second subunit comprising a second subset of the plurality of channels.

12. The fueling system of claim 11, wherein the EV charging station further comprises a control unit, and wherein the switching unit and the control unit are coupled by wires within a single unit.

13. The fueling system of claim 12, wherein the control unit comprises a component selected from the group consisting of: a card swipe interface; a radio frequency identification (RFID) proximity key and card reader; and an alphanumeric keypad.

14. The fueling system of claim 9, wherein the first state information comprises data per charging transaction.

15. The fueling system of claim 9, wherein the EV charging station comprises a plurality of output connections, and wherein the first state information comprises amperages versus time of charging currents for each output connection of the plurality of output connections.

16. A system, comprising:
    a processor; and
    memory coupled to the processor, the memory comprising computer-executable instructions that, when executed, perform a method of integrated fuel management, the method comprising:
        receiving state information for an EV charging station;
        receiving state information for a non-charging fueling station; and
        generating a graphical user interface configured to present information comprising the state information for the EV charging station and configured to present information comprising the state information for the non-charging fueling station.

17. The system of claim 16, wherein the EV charging station is coupled to a switching unit, wherein the switching unit comprises a plurality of channels, and wherein the switching unit further comprises a first subunit comprising a first subset of the plurality of channels and a second subunit comprising a second subset of the plurality of channels.

18. The system of claim 16, wherein the EV charging station is coupled to a control unit, wherein the control unit comprises a component selected from the group consisting of: a card swipe interface; a radio frequency identification (RFID) proximity key and card reader; and an alphanumeric keypad.

19. The system of claim 16, wherein the state information for the EV charging station comprises data per charging transaction.

20. The system of claim 16, wherein the EV charging station comprises a plurality of output connections, and wherein the state information for the EV charging station comprises amperages versus time of charging currents for each output connection of the plurality of output connections.

* * * * *